(12) United States Patent
Scudder

(10) Patent No.: US 7,036,441 B2
(45) Date of Patent: May 2, 2006

(54) SAFETY SYSTEM FOR MOBILE ANHYDROUS AMMONIA FERTILIZER SYSTEM

(76) Inventor: Bradley E. Scudder, 4304 S. 6th St., Rockford, IL (US) 61109

( * ) Notice: Subject to any disclaimer, the term of this patent is extended or adjusted under 35 U.S.C. 154(b) by 538 days.

(21) Appl. No.: 10/354,366

(22) Filed: Jan. 30, 2003

(65) Prior Publication Data
US 2003/0111624 A1 Jun. 19, 2003

Related U.S. Application Data

(63) Continuation-in-part of application No. 09/973,276, filed on Oct. 9, 2001, now abandoned.

(51) Int. Cl.
*F16K 17/36* (2006.01)
*F16K 35/00* (2006.01)

(52) U.S. Cl. ............ 111/119; 111/200; 137/68.15; 251/89.5; 239/147; 239/722; 239/578

(58) Field of Classification Search ........ 239/146–147, 239/722, 569, 578, 602; 111/118–129, 200; 137/68.14–68.17; 251/89.5
See application file for complete search history.

(56) References Cited

U.S. PATENT DOCUMENTS

| | | | | |
|---|---|---|---|---|
| 3,650,093 | A * | 3/1972 | Rosenberg | 96/6 |
| 4,043,765 | A * | 8/1977 | Tanner | 44/519 |
| 4,051,876 | A * | 10/1977 | Foulkes | 141/1.1 |
| 4,446,881 | A * | 5/1984 | Kitamura et al. | 137/1 |
| 5,749,968 | A * | 5/1998 | Melanson et al. | 118/300 |
| 5,975,162 | A * | 11/1999 | Link, Jr. | 141/231 |
| 6,244,520 | B1 * | 6/2001 | Patchett | 239/114 |
| 6,769,969 | B1 * | 8/2004 | Duescher | 451/59 |
| 2002/0168216 | A1* | 11/2002 | Policicchio et al. | 401/270 |
| 2003/0066557 | A1* | 4/2003 | Scudder | 137/68.14 |
| 2003/0111624 | A1* | 6/2003 | Scudder | 251/89.5 |

* cited by examiner

*Primary Examiner*—Christopher J. Novosad
(74) *Attorney, Agent, or Firm*—Keith Frantz

(57) ABSTRACT

A safety system for a mobile anhydrous ammonia fertilizer application system is configured to be remotely actuated closed by the operator in the event of a leak in the system, and to automatically shutdown the system in the event of an actual or impending nurse tank breakaway.

16 Claims, 12 Drawing Sheets

SAFETY SYSTEM FOR MOBILE ANHYDROUS AMMONIA FERTILIZER SYSTEM

CROSS-REFERENCES TO RELATED APPLICATION

This application is a continuation-in-part and claims priority benefit to U.S. patent application Ser. No. 09/973,276, filed Oct. 9, 2001 now abandoned.

REFERENCE TO MICROFICHE APPENDIX

N/A.

STATEMENT REGARDING FEDERALLY SPONSORED RESEARCH OR DEVELOPMENT

N/A.

BACKGROUND OF THE INVENTION

1. Field of Invention

The present invention relates generally to safety apparatus for mobile anhydrous ammonia fertilizer systems.

More particularly the invention relates to a safety system including a safety shut-off valve provided with remote actuation to shut down the flow of anhydrous ammonia in the event of a leak in an anhydrous ammonia fertilizer system, and in the event the anhydrous ammonia nurse tank breaks-away from the tractor or implement to which it is connected.

2. Description of Prior Art

Anhydrous ammonia is a widely used source of fertilizer; it is readily available and it applies relatively easily. Anhydrous ammonia is also used to control mold growth in high moisture grains, and to add non-protein nitrogen to corn silage.

However, anhydrous ammonia is extremely dangerous. Among other things, anhydrous ammonia can cause damage to eyes, and to mucous membranes such as in the nose, mouth, and throat. Inhalation can cause damage to the lining of the lungs, inhibiting oxygen transference from the lungs into the blood stream. Exposure to high concentration levels of anhydrous ammonia can cause convulsive coughing and respiratory spasms.

Ammonia gas is colorless, but it has a sharp pungent odor that makes it easily detectable. When used as fertilizer, ammonia gas is compressed into a liquid and stored in high pressure tanks. The high pressure under which anhydrous ammonia is stored, and its caustic chemical nature, make anhydrous ammonia one of the more dangerous chemicals used in agriculture.

A typical anhydrous ammonia fertilizer system includes a high-pressure nurse tank in which the liquid anhydrous ammonia is stored and transported, a tool bar connected between the nurse tank and the back of a tractor, a set of knives extending from the tool bar into the ground to till the soil as the tool bar and nurse tank are pulled through a field by the tractor, a set of applicator tubes associated with the knives to dispense the anhydrous ammonia into the soil, a manifold to distribute the anhydrous ammonia to the applicator tubes, and a hose connected from the nurse tank to the manifold to supply anhydrous ammonia.

The anhydrous ammonia fertilizer system also typically includes an excess flow valve supplied as part of the nurse tank, a main shutoff valve connected to the nurse tank at the upstream end of the hose, a breakaway valve connected between the main shutoff valve and the downstream end of the hose, and a manifold shutoff valve connected between the manifold and the downstream end of the hose. The main shutoff valve is typically manually operated to control flow from the nurse tank to the distribution manifold, and the manifold shutoff valve is typically operated remotely via hydraulics to control the flow from the manifold to the applicator tubes.

The purpose of the breakaway valve is to automatically stop the flow of anhydrous ammonia in the event the nurse tank separates from the tractor. The breakaway shutoff valve typically consists of male and female sections that are held together such as by spring-biased ball detents. As long as the parts are together, the anhydrous ammonia will flow through unrestricted. If the hose pulls tight, the male and female parts of the breakaway valve are suppose to separate, and a spring-biased check valve located in each part is to close to shut off the flow of anhydrous ammonia, thereby preventing a rupture in the hose itself and damage to the main valve on the nurse tank.

The excess flow valve is intended to detect excess flow rates from the nurse tank, and shutdown the flow of anhydrous ammonia therefrom, such as if the hose or a hose connection ruptures, whether or not the nurse tank has separated from the toolbar. In this way, the excess flow valve also provide a backup function to a grossly malfunctioning breakaway valve.

However, even with such safety features and redundancies, anhydrous ammonia fertilizer systems still present real dangers to the operator. If a leak develops in the system, short of causing separation of the breakaway valve, or resulting in flow less than the triggering threshold of the excess flow valve, then the system operator must manually close the main shutoff valve to stop the leak. Often times, this will require the operator to be in close proximity to the escaping anhydrous ammonia, and thus, at risk of contacting and breathing the gaseous ammonia.

Hoses are typically the weakest link in an anhydrous ammonia fertilizer system. They are susceptible to soft spots, cuts, ruptures and tears; and they tend to blister, bulge, crack, and slip near couplings. If the structural integrity of a hose is compromised, anhydrous ammonia will spray out. Due to the high pressure under which the liquid ammonia is under, and expansion of the ammonia as it sprays into the atmosphere, such leaks can engulf the entire area with vaporized ammonia. As a result, the operator may need to fight his way through the cloud of vapor to reach the main shutoff valve.

And if a leak develops while fertilizing a field, the operator would need to stop the tractor, exit from the cab, and circle around the fertilizer system to reach the main shutoff valve. The time this takes results is additional hazardous ammonia being lost and sprayed into the air.

In addition, the excess flow valve and break-away valve can be unreliable and subject to malfunction. The excess flow valve is typically supplied inside the nurse tank, and is therefore not a component that the operator would normally be concerned with. And the breakaway valve is not a component that is easily checked in the field for proper or reliable operation. Therefore, these valves is often overlooked by the operator prior to undertaking fertilizer operations, and in many instances, they may be seldom actually checked for reliable or proper operation. Thus, failure of either the excess flow valve to shutdown, or failure of the check vales in the breakaway from to seal off the separated halves, can result in the above-mentioned spraying out of anhydrous ammonia into the surrounding area. In addition to the dangers associated with potential exposure to anhydrous ammonia should either of these valves malfunction, failure of the male and female halves to separate as the hose becomes too taught can also result in irreparable damage to the hose, to the main shutoff valve, and to other components connected thereto in the fertilizer system.

Consequently, there is a need for safety apparatus in an anhydrous ammonia fertilizer system that can be actuated closed at a safe distance from leaking anhydrous ammonia, that will automatically actuate closed if the hose becomes sufficiently tight to present an impending potential for a leak to develop or for damage to the hose and other components in the system, and that is further effective as a backup safety shutoff valve should either the excess flow valve or the breakaway valve fail to function properly. Thus, there is a need for a safety system including a shutoff valve that cam be actuated closed by the operator when in the tractor cab, as well as when standing or working between the cab and the nurse tank, and that is configured to automatically detect when the hose is becoming stretched to a point of danger and automatically stop the flow of anhydrous ammonia before the hose reached the point at which the breakaway valve will separate.

SUMMARY OF THE INVENTION

The general purpose of the present invention is to provide safety apparatus for an anhydrous ammonia fertilizer system that is remotely actuated to quickly shut off the flow of anhydrous ammonia in the event of a hose leak.

Another important objective of the invention is to provide safety apparatus for an anhydrous ammonia fertilizer system that is actuated closed in the event of a potential impending hose leak.

A detailed objective of the invention is to provide a safety system comprising a shutoff valve that can be remotely actuated closed by the operator from inside the tractor cab, thus permitting quick actuation of the valve to the closed position if a leak develops while working a field, and from a safe distance away from the leak.

Another detailed objective is to provide such a safety system that is further adapted to be actuated closed at the valve, as well as from locations between the valve and the tractor, to enable quick actuation of the valve closed regardless of where the operator may be standing when the leak develops.

Still another detained objective is to provide unique cable apparatus between the valve and the tractor cab for remote actuation of the valve closed.

Another detailed objective of the invention is to provide safety apparatus for an anhydrous ammonia fertilizer system that is responsive to an actual or impending breakaway of the nurse tank from the tractor.

Yet another detailed objective is to provide safety apparatus that functions as a backup to the excess flow valve and breakaway valve in a conventional anhydrous ammonia fertilizer system, but that does not rely on detection of a leak or excess flow or other abnormal operational condition thereof to automatically actuate closed.

Still another detailed objective is to provide a unique safety shutoff valve and actuation cable that are reliably responsive to breakaway of the nurse tank to stop the flow of anhydrous ammonia from the nurse tank.

These and other objectives and advantages of the invention will become more apparent from the following detailed description when taken in conjunction with the accompanying drawings.

Briefly, safety apparatus in accordance with the invention includes a safety shutoff valve connected in-line between the main shutoff valve on the nurse tank and the break-away valve. The safety shutoff valve is spring-biased to the closed position, and is manually cocked to the open position for normal operation of the fertilizer system.

A handle enables manual opening of the safety shutoff valve, and a latch mechanism automatically engages the handle to normally maintain the valve in the open position.

In one preferred embodiment, an actuation, release cable is connected between the latch mechanism and a release handle positioned at a convenient location in the tractor cab. The release handle, acting through the release cable, enables the operator to draw the latch mechanism from the valve handle, resulting in the valve automatically closing to stop the flow of anhydrous ammonia.

The release cable is provided with a shear section that separates, after actuating the safety shutoff valve closed, in the event of a break-away condition between the tractor and the nurse tank.

The safety shutoff valve can be alternately closed by the operator at the valve, or at any location between the valve and the cab by simply pulling or pushing on the cable. This permits convenient closing of the valve if, for example, the operator is performing cleaning or maintenance work on of near the system.

In preferred embodiments, the release cable is sized with slightly less free length than the anhydrous ammonia hose. In this way, the release cable will sense is the nurse tank begins to separate from the toolbar prior to complete breakaway, by increasing tension in the cable, and actuate the safety shutoff valve.

In an alternate preferred embodiments, the release cable is connected between the valve release latch mechanism and a stationary location with respect to the discharge end of the anhydrous ammonia hose, and is sized with less free length than the hose to actuate the shutoff valve closed should the nurse tank begin to break away.

Reference numerals shown in the drawings correspond to the following items:
10—safety shutoff valve
12—anhydrous ammonia fertilizer system
14—tractor
16—nurse tank
18—anhydrous ammonia
20—tool bar
20a—translating or sliding connection at toolbar
22—knives
24—applicator tubes
26—manifold
28—hose
30—main shutoff valve
32—breakaway valve
34—manifold shutoff valve
36—release cable
36a—intermediate end of release cable
36b—intermediate end of release cable
38a—end coupling for release cable
38b—end coupling for release cable
40—shear section
42—valve housing
44—upstream end of housing
46—downstream end of housing
48—flow passage in housing
50—ball valve element
52—spherical center
54—opening in spherical center
56—valve stem
58—flange
58a—cam surface on flange
60—handle
62—spring for ball valve
64—stop pin
64a—end of stop pin associated with flange
64b—opposite end of stop pin
66—support blocks
68—spring for stop pin
70—retaining ring
72—slot
74—crimp fitting
76—guide cone
78—release lever in tractor cab
80—release handle on valve
82—pivot pin
84—pivot pin
86—hole in flange
88—hole in housing
90—shear coupling
92—female section
94—male section
96—separable portions
98—tapered face
100a—lead-in taper
100b—lead-in taper
102—tapered face
104—alternate shear section
106—replaceable shear element
108—shear element holders
110—locking pin
112—second alternate shear section
114—male section
116—female section
118—insert
120—separable portions
122—coupling
124—annular lip
A-A—axis of rotation
140—alternate anhydrous ammonia fertilizer system
142—alternate safety shutoff valve
144—alternate release cable
146—ring connector
148—valve body
150—flange
152—excess flow valve
160—second alternate anhydrous ammonia fertilizer system
162—second section release cable
180—third alternate anhydrous ammonia fertilizer system
182—second alternate release cable
184—compressed air tank air supply
186—air hose While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, one embodiment of the present invention is shown in the drawings in connection with an anhydrous ammonia fertilizer system 12 (FIG. 1) adapted to be pulled through a field by a tractor 14 that is driven by the system operator.

Figure 1:
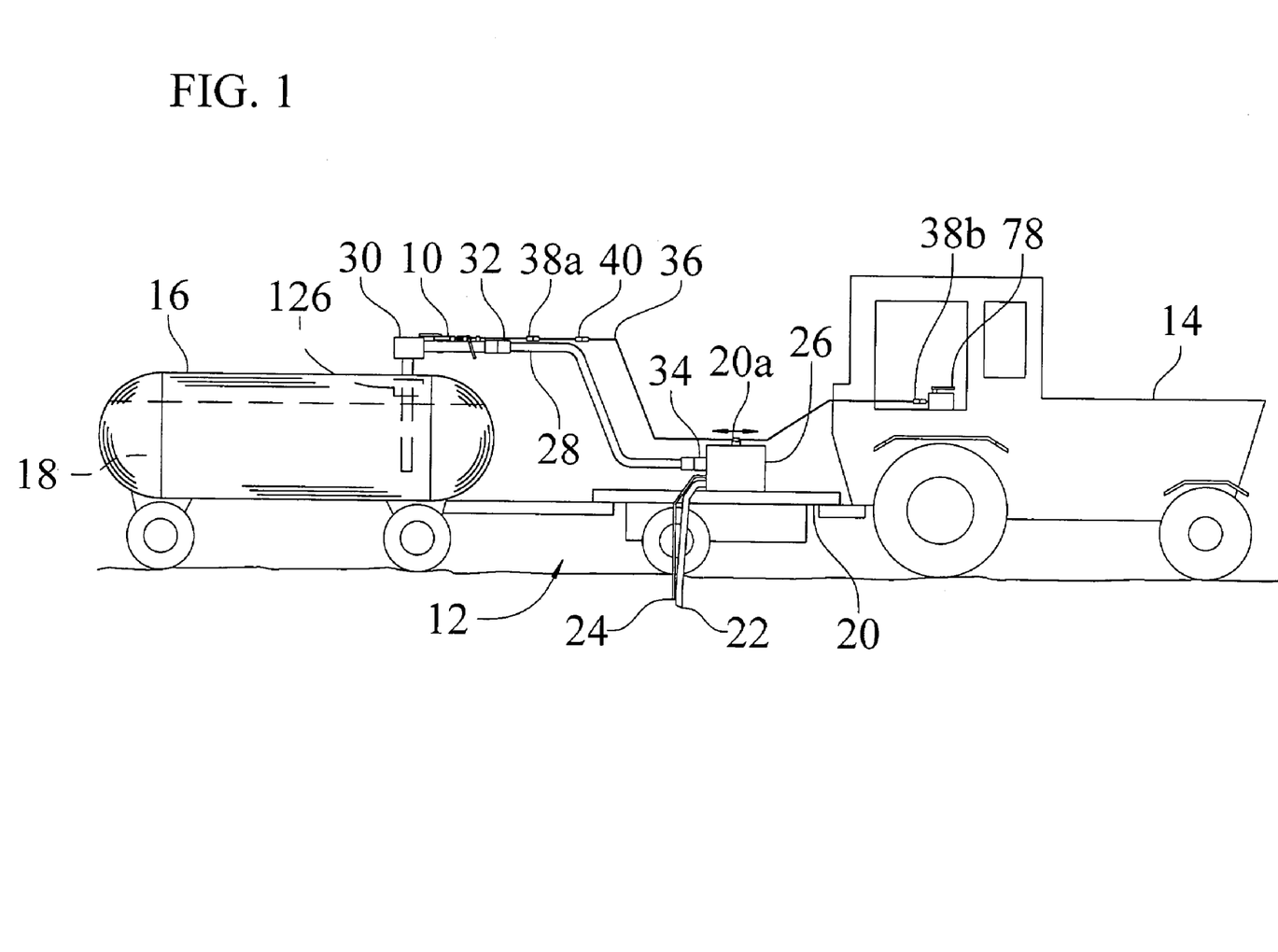
FIG. 1 is a side view of a tractor and an anhydrous ammonia fertilizer system incorporating certain unique aspects of the present invention.

The anhydrous fertilizer system 12 shown includes a high-pressure nurse tank 16 in which the liquid anhydrous ammonia 18 is stored and transported, and a tool bar 20 connected between the nurse tank and the back of the tractor 14. A set of laterally spaced knives 22 extend from the tool bar into the ground for tilling the soil as the tool bar and nurse tank are pulled through a field by the tractor, and a set of applicator tubes 24 associated with the knives dispense the anhydrous ammonia into the tilled soil. A manifold 26 carried on the toolbar receives anhydrous ammonia through a hose 28 connected to the nurse tank, and distributes the anhydrous ammonia to the applicator tubes. A main shutoff valve 30 connected to the nurse tank is manually operated to control the availability of anhydrous ammonia flow from the nurse tank to the manifold. A manifold shutoff valve 34 is connected between the manifold and the downstream end of the hose, and is operated remotely via hydraulics (not shown) to control the flow of anhydrous ammonia from the manifold to the applicator tubes 24. A breakaway valve 32 is connected between the main shutoff valve and the upstream end of the hose, and is adapted to separate, to automatically stop the flow of anhydrous ammonia, in the event the nurse tank 16 separates from the toolbar 20. An excess flow valve 126 located in the nurse tank is designed to stop the flow of anhydrous ammonia in the event of a high volume leak in the system.

In accordance with one aspect of the present invention, a safety system is provided for remotely shutting off the flow of ammonia in the event of a leak in the fertilizer ammonia transfer system 12 or in the event of a nurse tank breakaway.

In carrying out this aspect of the invention, a manually operable safety valve 10 is positioned in the fertilizer system 12 between the main shutoff valve 30 and the breakaway valve 32, and an actuation/release cable apparatus 36 extends from the safety valve to a release lever 78 in the tractor cab 14 for remote actuation of the safety valve to the closed position. The safety valve is spring biased toward the closed position, and is manually actuated to the open position whereupon a latch mechanism acts to normally maintain the valve in the open position. The release cable is operable with the release lever in the cab, as well as from locations between the cab and the nurse tank, to release the latch mechanism such that the safety valve snaps shut.

As a result, the operator can quickly and easily shutdown the fertilizer system 12, and stop leaking anhydrous ammonia, thereby avoiding or limiting injury and limiting the release and loss of the anhydrous ammonia into the atmosphere.

Figure 2:
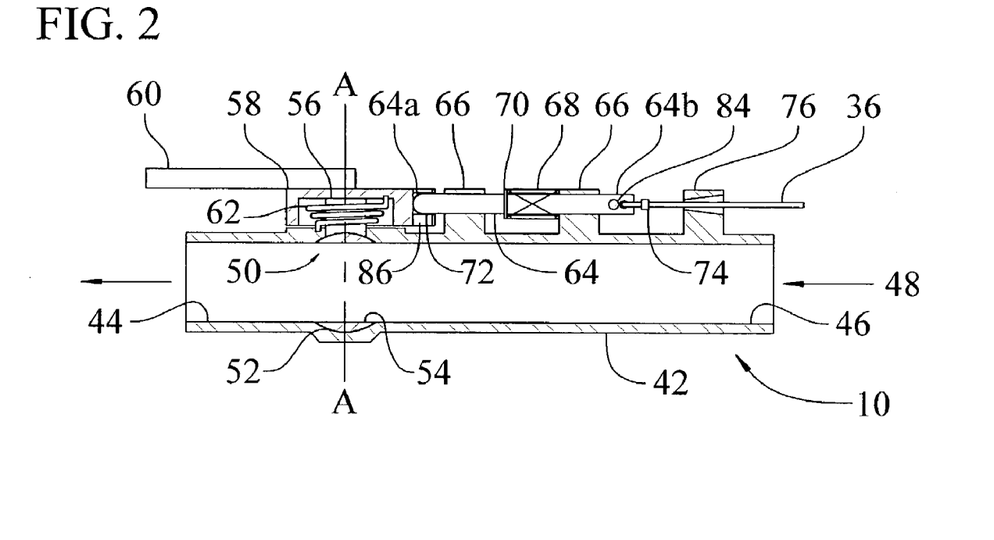
FIG. 2 is side cross-sectional view taken longitudinally through a safety valve in accordance with the invention, and showing the valve in its open position.
Figure 3:
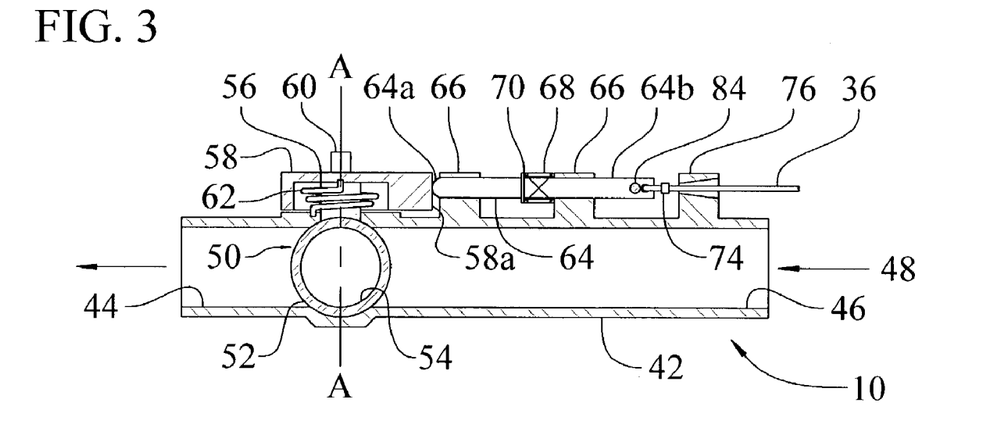
FIG. 3 is a view similar to FIG. 2 but showing the valve in its closed position.
Figure 4:
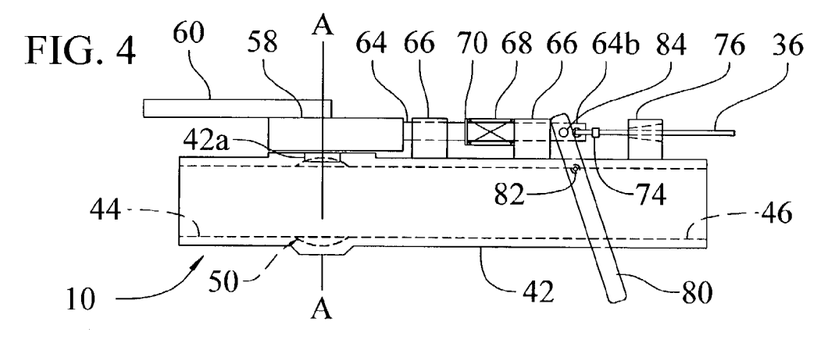
FIGS. 4 and 5 are side views of the valve shown in its open and closed positions, respectively.
Figure 5:
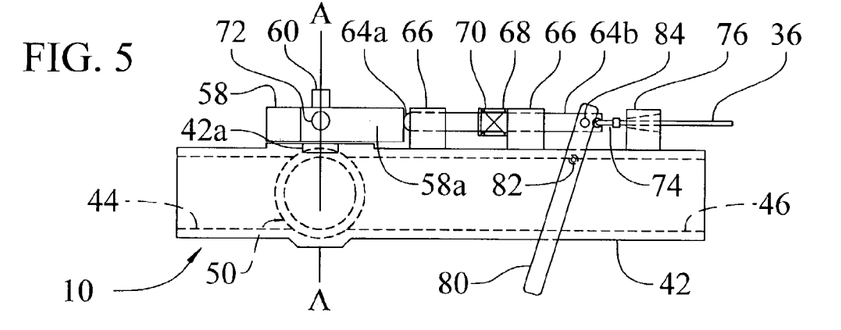
Figure 6:
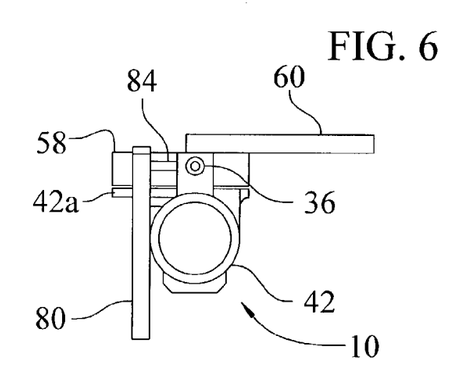
FIGS. 6 and 7 are downstream end views of the valve shown in its open and closed positions, respectively.
Figure 7:
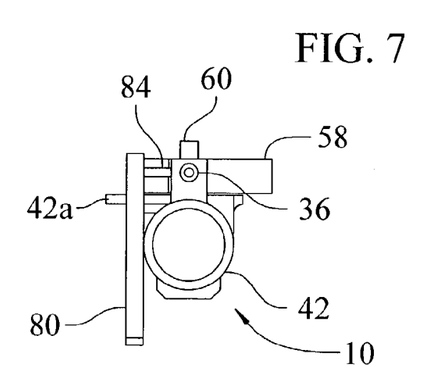
Figure 8:
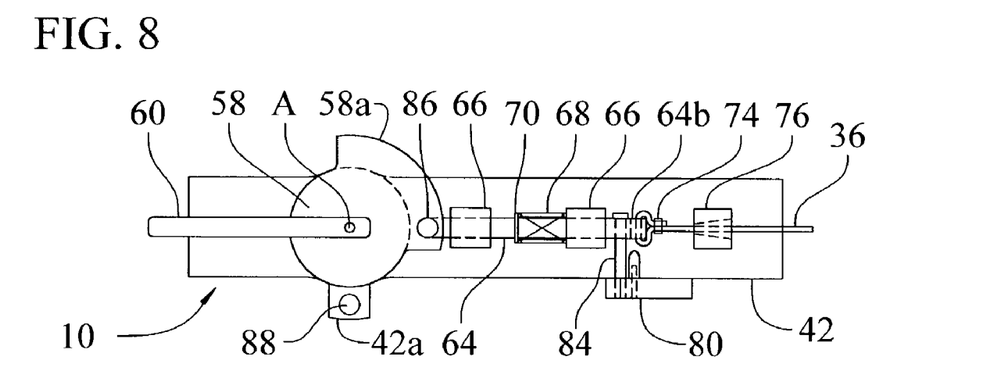
FIGS. 8–10 are top views of the valve shown in its open position, mid-way between its open and closed position, and is closed position, respectively.
Figure 9:
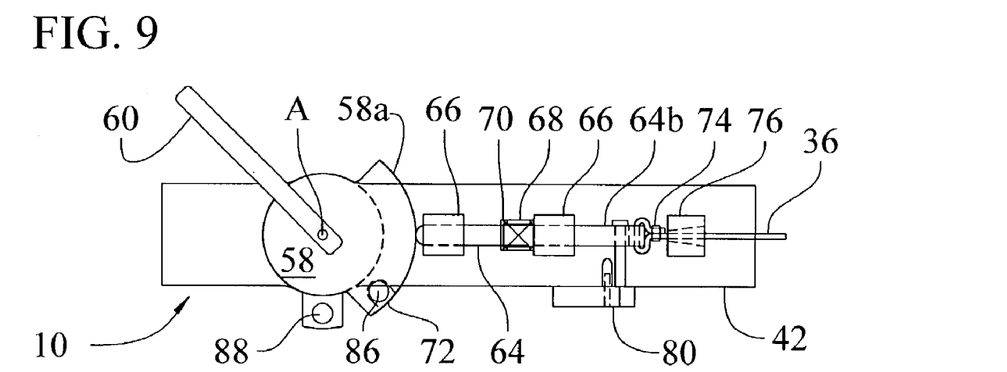
Figure 10:
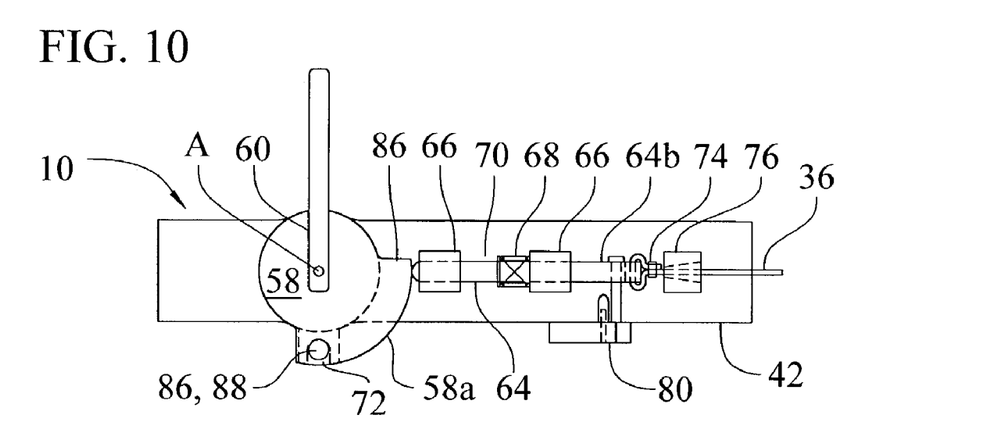
Figure 11:
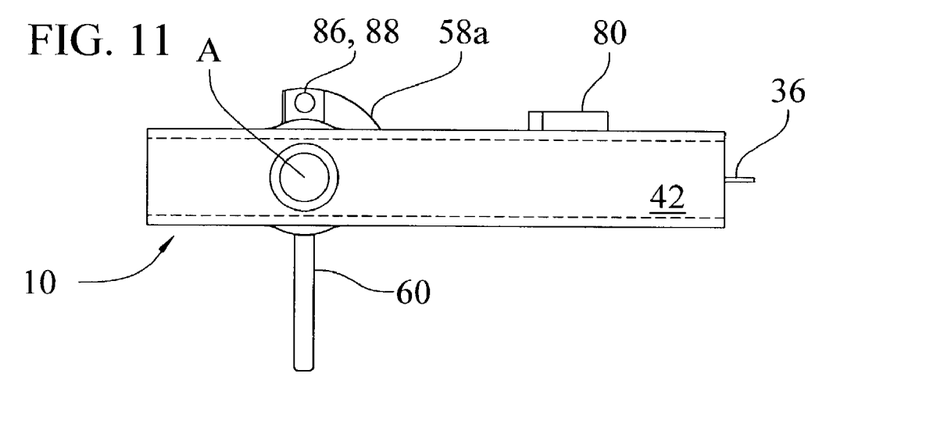
FIG. 11 is a bottom view of the valve in its closed position

The safety valve 10 includes a housing 42 provided with upstream and downstream couplings indicated as threaded ends 44 and 46, respectively, for connection to threaded couplings at the downstream end of main shutoff valve 30 and the upstream end of the breakaway valve 32, respectively, and a flow passage 48 communicating between the end couplings 44 and 46 for flow of anhydrous ammonia therethrough.

A valve element 50 is positioned in the housing 42 to open and close the flow passage 48. In the embodiment shown, the valve element is provided in the form of a ball valve that includes a spherical center 52 positioned in the flow passage 48 rotatable about axis A—A and provided with a through hole 54 extending transversely thereto. When the ball valve is positioned with the opening 54 aligned with the flow passage as shown in FIG. 2, the flow passage is open. When the ball valve is rotated ninety degrees so that the opening 54 extends laterally as shown in FIG. 3, the flow passage is closed. In this instance, a valve stem 56 projects from the spherical center 52 through the valve housing 42, a flange 58 is connected at the free end of the valve stem, and a handle 60 is carried by the flange to enable manual rotation of the ball valve. A spring 62 operably connected between the movable flange and the stationary housing biases the ball valve toward the closed position. As a result, the ball valve element is spring biased toward the closed position (FIG. 3), and can be manually actuated to the open position (FIG. 2) by grasping and turning the handle 60.

A latch mechanism carried by the housing 42 is adapted to engage the flange 58 and maintain the valve 10 in the open position. In the embodiment shown, the latch is provided in the form of a stop pin 64 slidably supported in co-axial openings, in spaced support blocks 66 that project from the housing, for movement between the valve open and valve closed positions as shown in FIGS. 2 and 3, respectively. A second spring 68 operably fitted between one of the stationary support blocks 66 and a shoulder on the movable stop pin, in this instance provided by a retaining ring 70 secured to the stop pin, continuously biases the stop pin towards the flange 58.

The end 64a of the stop pin associated with the flange 58 (the left end as shown in the drawings) is sized to slip into an indentation in the housing, such as slot 72 cut into the side of the flange, and in this instance, extending radially toward the flange center axis A—A. With the valve 10 in the closed position, the end 64a of the stop pin is biased against a cam surface 58a formed on the flange, and the flange is free to be rotated. As the valve is manually turned to the open position, the stop pin rides against this cam surface until the slot 72 aligns with and opens to the axis of the stop pin, whereupon the spring 68 biases the stop pin into the slot to automatically secure the valve in the open position.

The release cable 36 is attached to the opposite end 64b of the stop pin 64 and extends through a guide cone 76 carried by the housing. In the embodiment shown, one end of the release cable extends through a cross-hole in the end 64b of the stop pin, and is clamped in position to the stop pin with a crimp-type fitting 74. As the release cable is pulled, to the right as shown in the drawings, the stop pin is drawn away from the flange 58 and is thus withdrawn from the slot 72 in the flange. The cable is slidably connected at the toolbar such as indicated at 20a (FIG. 1) for controlled location between the nurse tank and the tractor, and the other end of the cable is connected to the manual release lever 78 located in the cab of the tractor 14. The release lever is movable between two positions associated with the open and closed positions of the shutoff valve. When the manual release lever 78 is rotated or pulled from the position associated with the valve open position to the position associated with the valve closed position, the stop pin backs out of the slot, releasing the handle 58, and the spring 62 snaps the safety valve closed. The release cable may also be pushed or pulled by the operator at any location between the safety valve and the cab, causing the stop pin to be withdrawn from the flange, and the valve to automatically close. In preferred embodiments, the release cable is sized in free length at slightly less than the free length of the hose 28 and any built-in play at the connection between the nurse tank, toolbar and tractor, so that the cable actuates the safety valve closed prior to a complete breakaway of the nurse tank from the toolbar, and prior to sufficient stretching that could cause a rupture in the hose.

The guide cone 76 reacts any side loading that may be applied to the cable 36, to ensure that a straight pulling action of the cable on the stop pin 64 is maintained along the axis of the pin. Alternately, for example, the cable may be supported in a simple eyelet (not shown) carried by the housing 42 to insure a straight pull.

A second handle 80 is pivotally carried by the housing 42 by pin 82 and is pivotally secured to the end 64b of the stop pin 64 with pin 84. With the valve in the open position, pulling the handle 80, to the left as shown in the drawings, withdraws the end 64a from the slot 72 whereupon the valve snaps closed. Thus, the handle 80 permits closing of the valve by the operator at the location of the valve.

Figure 12:
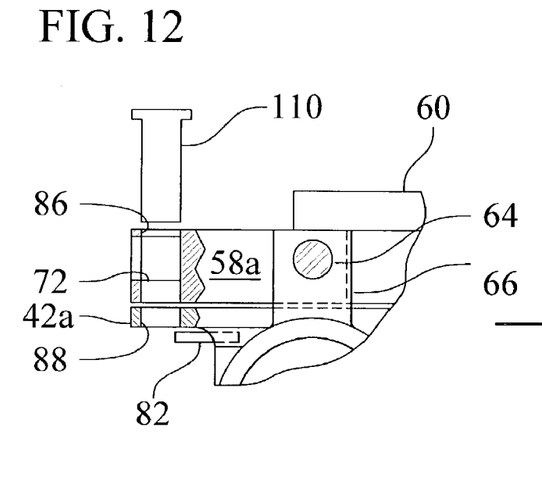
FIG. 12 is an enlarged fragmentary end view with certain parts broken-away and shown in cross-section.
Figure 13:
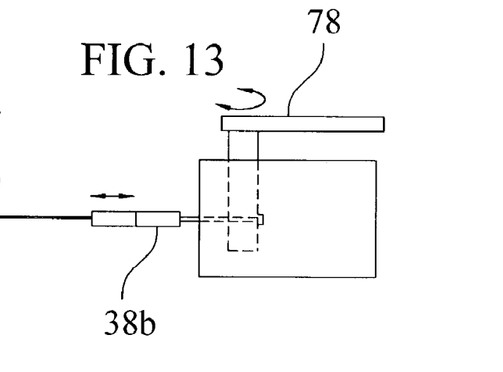
FIGS. 13 and 14 is an enlarged views of certain parts shown in FIG. 1, including end connections of the actuation and release cable.
Figure 14:
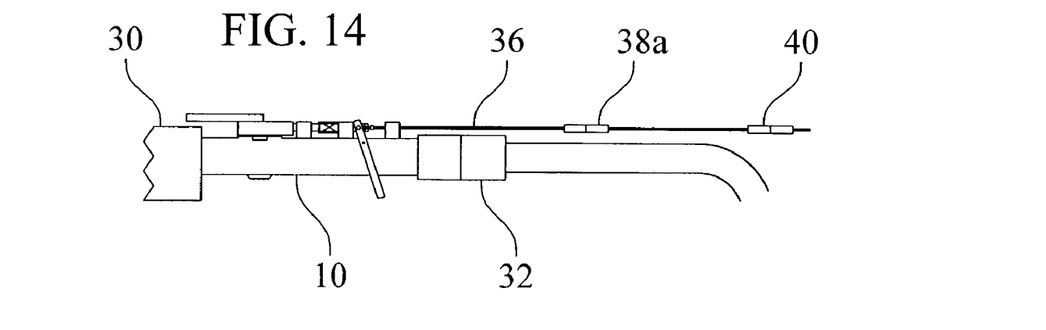
Figure 15:
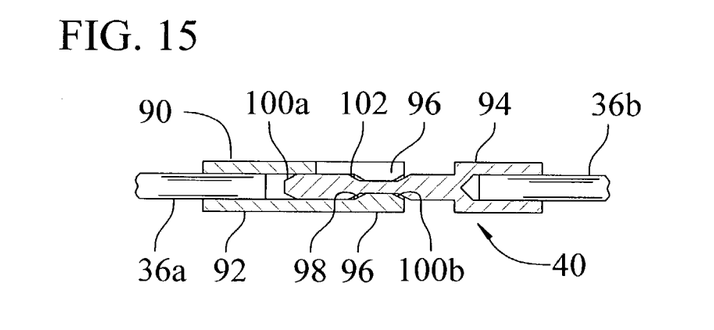
FIG. 15 is a longitudinal cross-sectional view of a shear section shown in FIG. 1.
Figure 16:
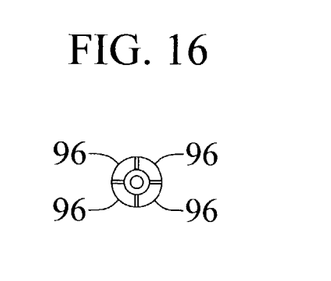
FIG. 16 is an end view of the female section shown in FIG. 15.
Figure 17:
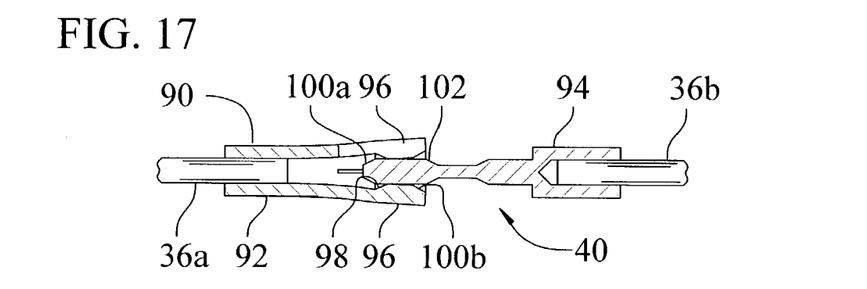
FIGS. 17–19 are views similar to FIG. 15 but showing progressive separation of the male and female sections thereof.
Figure 18:
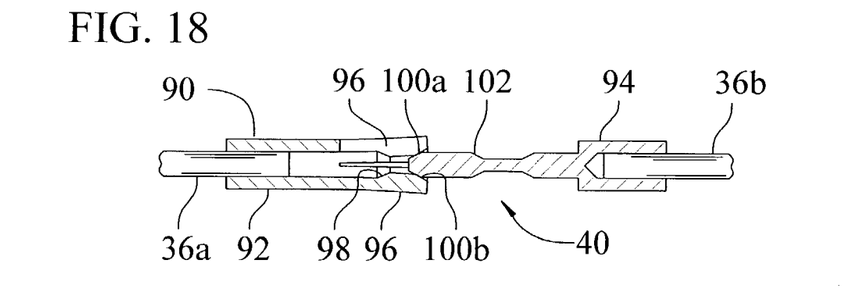
Figure 19:
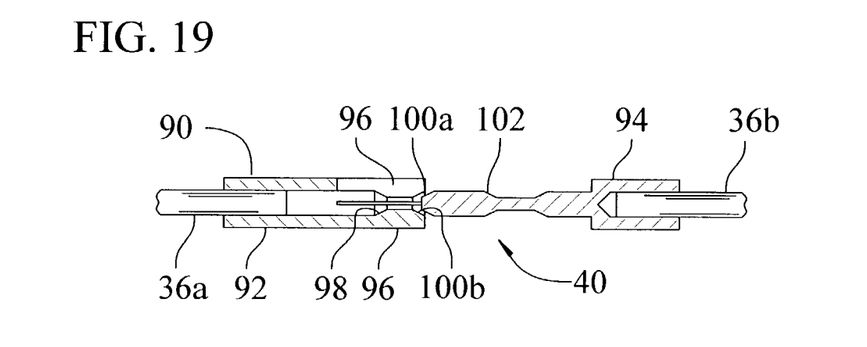

To prevent inadvertent and/or unauthorized opening, the safety valve 10 includes a manual lockout. In the embodiment shown, the lockout is provided in the form of the flange 58 being further provided with a through hole 86 that aligns with a hole 88 in the housing flange 42a when the valve 10 is in the closed position. This enables the operator to secure the valve closed such as with a locking pin 110 (FIG. 12) or a padlock extending through the aligned openings 86 and 88.

The release cable 36 is provided with couplings 38a, 38b, such as threaded or bayonet-type quick-connect couplings, proximate each end, and a shear or break-away section 40 at a convenient in-line location between the nurse tank 16 and the toolbar 20. The couplings provide for connection to the safety valve 10 and the release lever 78 in the cab, and for removal of the cable therefrom for ease of breakdown and storage of the fertilizer system components, to enable the release lever to be left mounted in the cab.

The shear section 40 is adapted to separate in the event of a complete break-away between the tool bar 20 and the nurse tank 16, but not until after actuating the safety valve 10 closed. More particularly, the shear section is adapted to maintain connection integrity during a predetermined pull force in the cable 36 sufficient to draw the stop pin 64 from the valve handle 58, but to then separate if the pull on the cable reaches a second predetermined higher tension. This provides a backup safety to the break-away valve 32 in the system to prevent release of ammonia.

In the embodiment shown in FIGS. 15–19, the shear section 40 is provided in the form of a coupling 90 that is crimped firmly onto one intermediate end 36a of the cable 36, and that includes a female section 92 that slidably receives a male section 94 crimped firmly onto the other intermediate end 36b of the cable. In this instance, the female section is slotted into quadrant portions 96 adapted to separate during insertion and removal of the male section and to resiliently return to their normal position shown in FIGS. 15 and 19.

The female section 92 is provided with an internal tapered portion 98 facing the intermediate end 36a of the cable to which it is crimped, and the male section 94 is provided with a tapered portion 102 complimentary to and facing oppositely of the tapered portion 98 in the female section. The complimentary tapers 98 and 102 of the male and female sections then cooperate to normally maintain the male section in the female section, up to a predetermined tension in the cable 36 that is at a lever higher than the pull required to actuate the safety valve 10 closed. Thus, for example, in the event of a break-away in the hose 28, the cable actuates the safety valve closed, and then the intermediate ends of the cable separate as the male section 94 withdraws from the coupling 90 when the tension in the cable reaches the second predetermined level associated with a break-away in the fertilizer system.

The male section 94 and female section 92 are also provided with lead-in tapers 100a and 100b, respectively that cooperate to cause the split sections 96 to resiliently separate as the male section is slidably inserted therein. In the event of separation of the shear section 40 as a result of a breakaway in the system, the cable 36 is restored for use by simply re-inserting the male and female sections back together.

Those skilled in the art will appreciate that the several mechanisms and components described above are readily modified and may be provided in alternate embodiments while remaining within the scope of the present invention. For example, but without limitation, the valve element may be provided in another of the various forms of known valve elements. Suitable alternate latch or toggle arrangements are known and will be readily devised by one skilled in the art. Alternate valve actuation mechanisms such as a movable linkage arrangement may be provided in place of a conventional cable.

Figure 20:
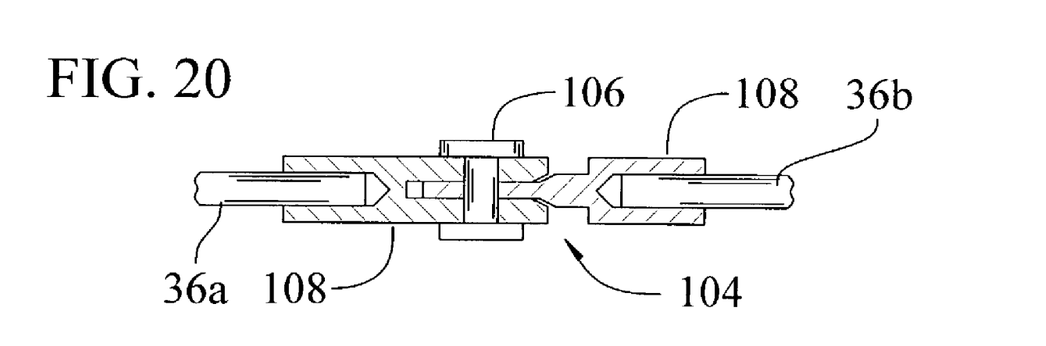
FIG. 20 is a longitudinal cross-sectional view of an alternate shear section.
Figure 21:
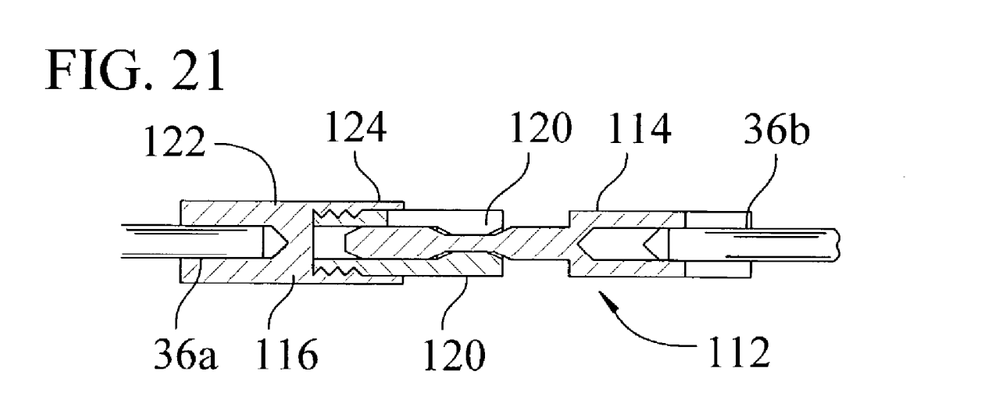
FIG. 21 is a longitudinal cross-sectional view of a second alternate shear section.

By way of further example, alternate shear sections are illustrated in FIGS. 20 and 21. The shear section 104 (FIG. 20) is provided with a replaceable shear-element 106 held transverse to the cable axis in a pair of holders 108 firmly connected to the intermediate ends of the cable. The shear section 112 (FIG. 21) is constructed with male and female sections 114 and 116 similar to shear section 40, except that in this instance, the female section includes an insert 118 provided with separable quadrant sections 120 that slidably receive the male section with a relatively low insertion force. When installed into the coupling 122, an annular lip 124 overlaps the closed-end portion of the quadrant portions 120 to provide additional holding strength, and raise the pull force that is required to withdraw the male section. The insert may be molded from a plastic-type material as an inexpensive replaceable insert (where one or more of the quadrant portions will break upon separation), or from a more resilient material for reuse following a breakaway.

Figure 22:
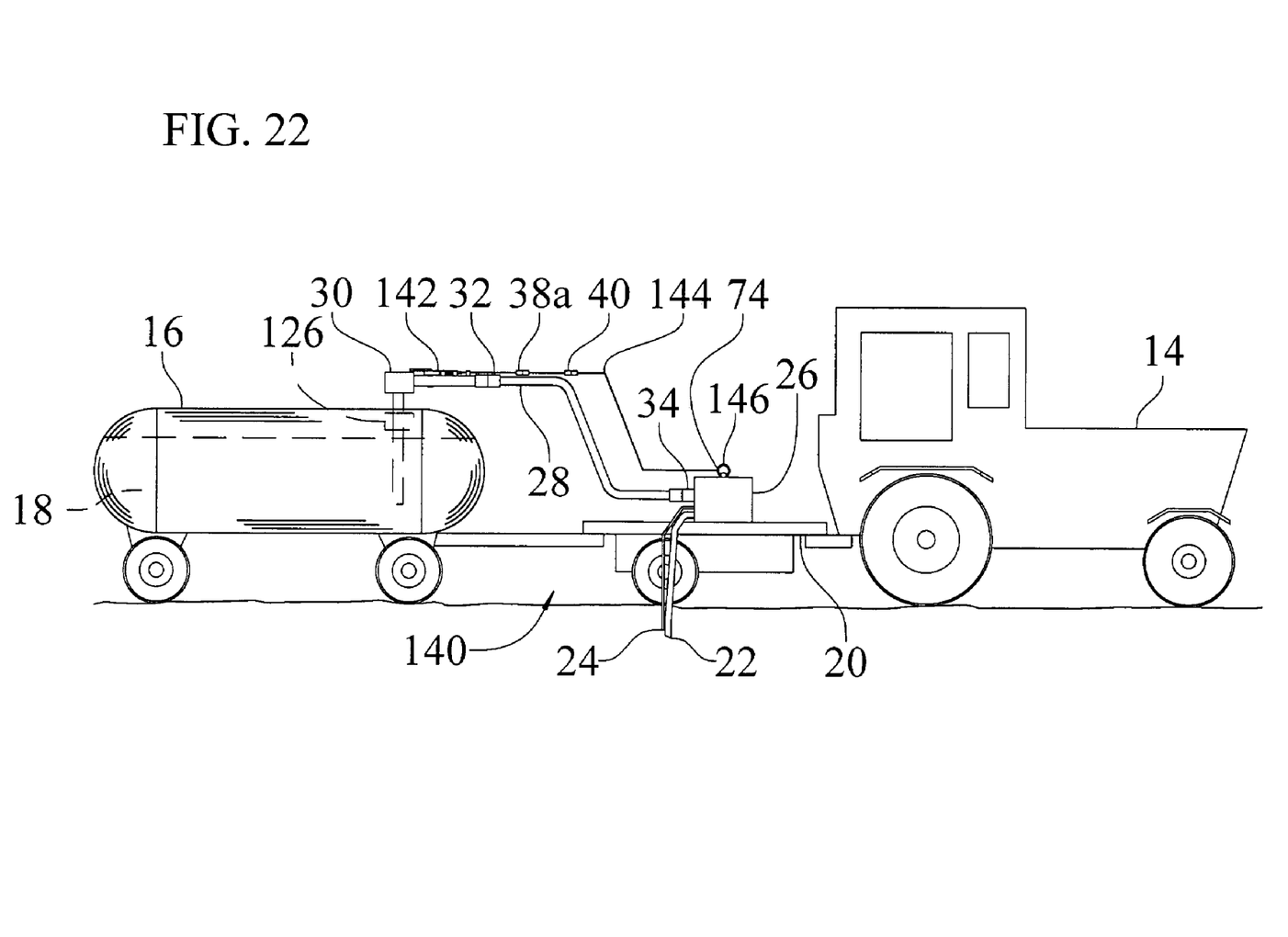
FIG. 22 is a side view of a tractor and an anhydrous ammonia fertilizer system incorporating certain additional aspects of the invention, including an alternate embodiment safety shutoff valve and release cable.

Referring now to FIG. 22, wherein like reference numerals refer to the same or similar components as shown in the first embodiment discussed above, there is shown an alternate fertilizer system 140 provided with an alternate embodiment safety shutoff valve 142 and release cable assembly 144 adapted to stop the flow of anhydrous ammonia from the nurse tank in the event the nurse tank breaks away from the toolbar 20.

The safety shutoff valve 142, shown in detail in FIGS. 25–31, is constructed and operates similar to safety shutoff valve 10, except that valve 142 is provided (i) without an additional manual shutoff mechanism, as embodied in handle 80 in valve 10 and associated structure and functionality, and (ii) without a manual lockout mechanism as embodied in the flange 58 provided with a through hole 86 that is alignable with hole 88 in the valve body 42. Consequently, the valve body 148 and flange 150 of valve 142 are constructed similar to valve body 42 and flange 58, respectively, but without the manual shutoff and manual lockout mechanisms.

The release cable 144 is constructed similar to release cable 36, and connected to the valve 142 as described above, through a shear section 40. The forward end of the release cable is crimped at 74 to a ring connector 146 that is connected to the toolbar 20, so as to be connected stationary with respect to the forward end of the anhydrous ammonia transfer hose 28. As a result, the release cable 144 will actuate the safety valve 142 closed if the nurse tank breaks away from the toolbar.

The release cable 144 is preferably sized in free length at slightly less than the free length of the hose 28 so that the cable actuates the safety valve 142 closed prior to a complete breakaway of the nurse tank from the toolbar 20, and prior to sufficient stretching that could cause a rupture in the hose. Consequently, the release cable and safety shutoff valve act as independent-path backup to the conventional excess flow valve 126 and breakaway valve 32 in the system.

Figure 23:
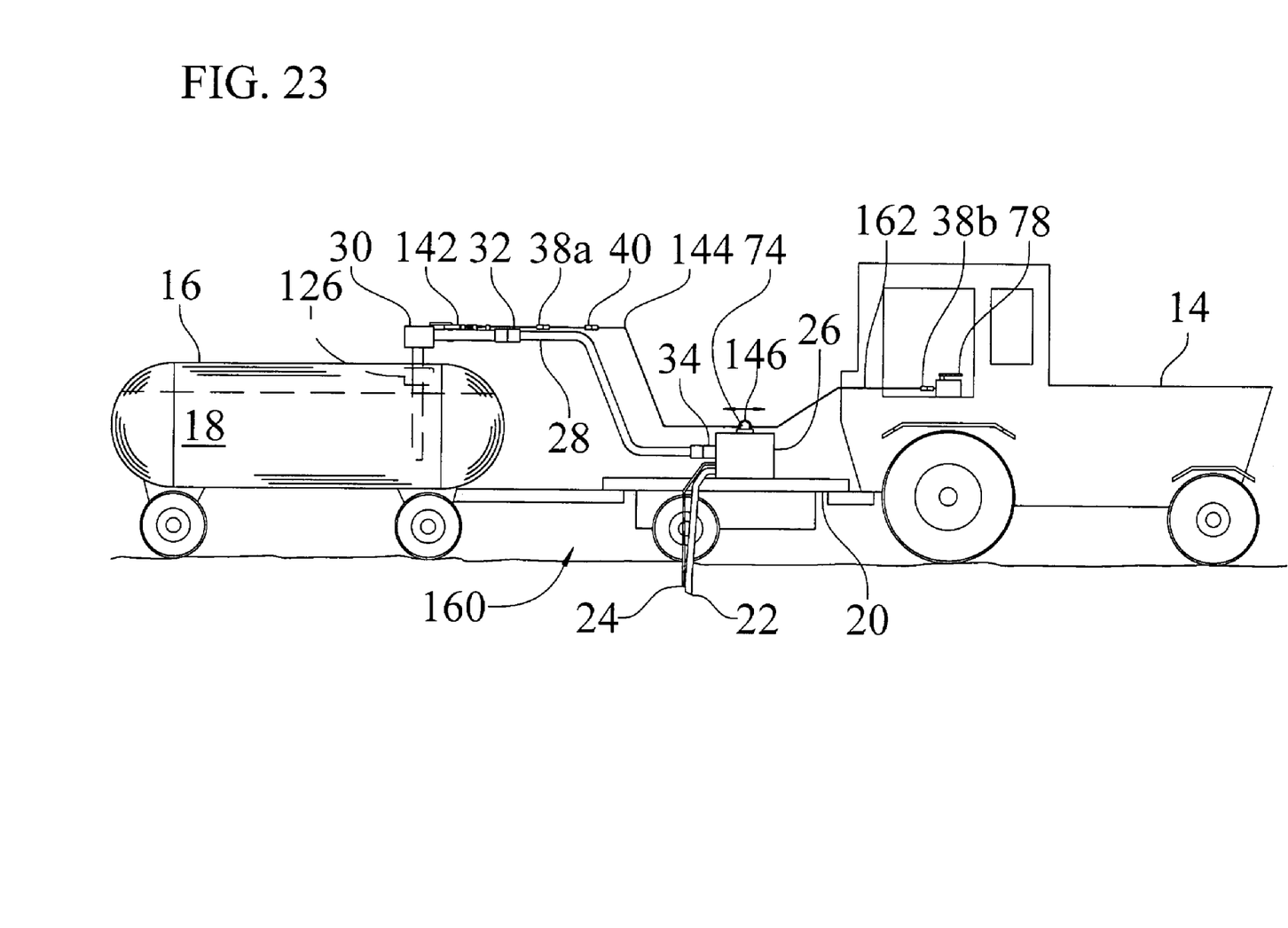
FIG. 23 is a view similar to FIG. 22 of an alternate anhydrous ammonia fertilizer system equipped with the safety valve and release cable arrangement of FIG. 22.

FIG. 23 illustrates a second alternate embodiment fertilizer system 160 similar to system 140 shown in FIG. 22, except that fertilizer system 160 is provided with a second release cable section 162 connected between the ring connector 146 and a manually operable release handle 78 mounted in the tractor cab. In this instance, the ring 146 is connected to the toolbar 20 for front to rear translation as indicated with double arrows in FIG. 23. Consequently, the combination of the release cable sections 144 and 162 is operative to actuate the safety shutdown valve 142 closed both automatically in the event of a nurse tank breakaway, or sufficient separation therebetween, and remotely from the tractor.

Figure 24:
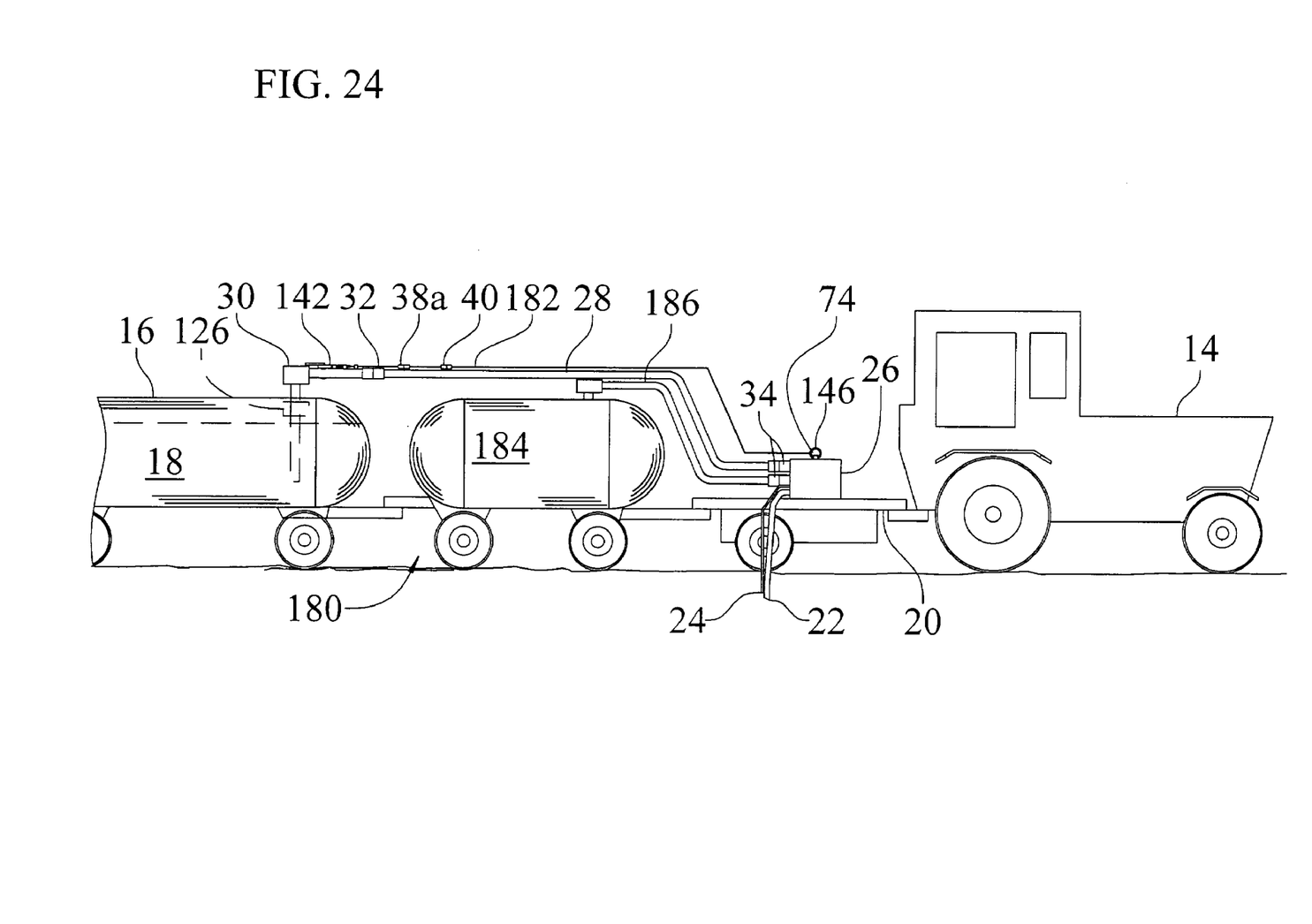
FIG. 24 is a view similar to FIG. 22 of another alternate embodiment anhydrous ammonia fertilizer system equipped with safety valve and release cable in accordance with the invention.
Figure 25:
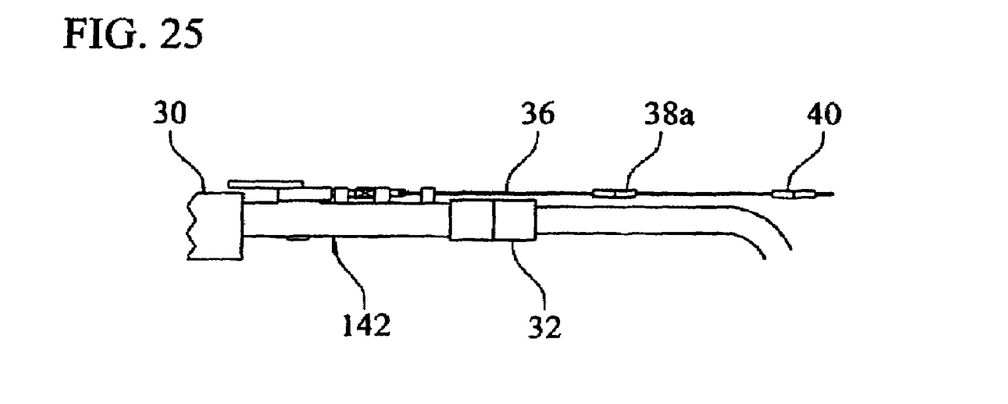
FIG. 25 is an enlarged view of the alternate safety shutoff valve as installed in the systems shown in FIGS. 22–24.
Figure 26:
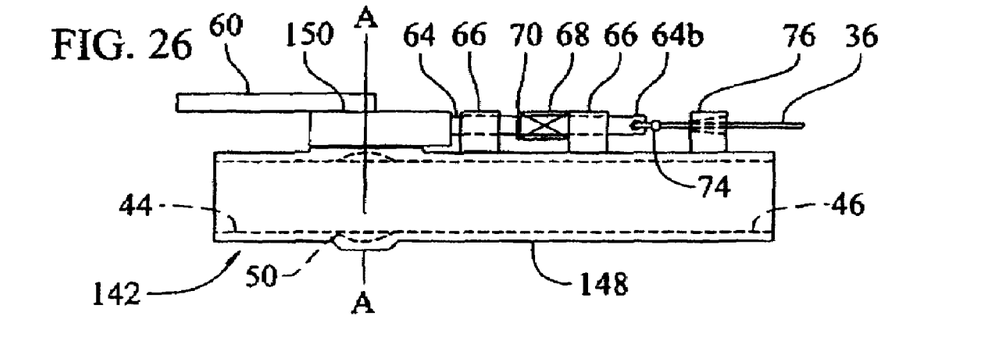
FIGS. 26 and 27 are sides views of the alternate safety shutoff valve in the open and closed positions, respectively.
Figure 27:
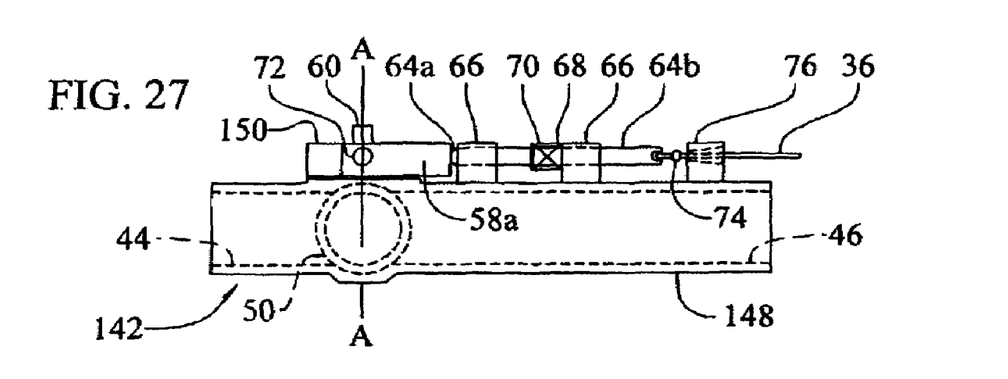
Figure 28:
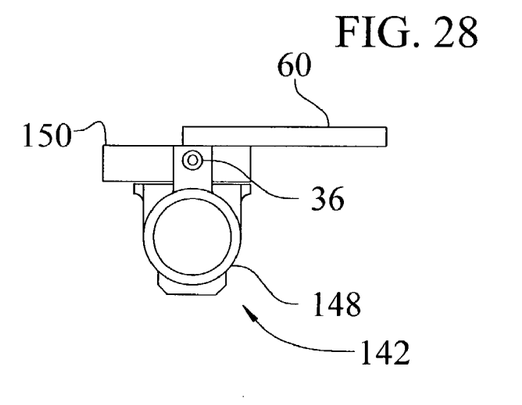
FIGS. 28 and 29 are end views of the alternate safety shutoff valve in the open and closed positions, respectively.
Figure 29:
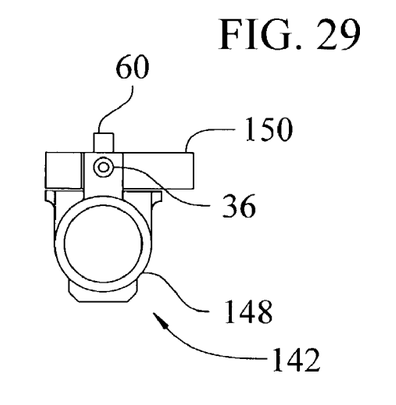
Figure 30:
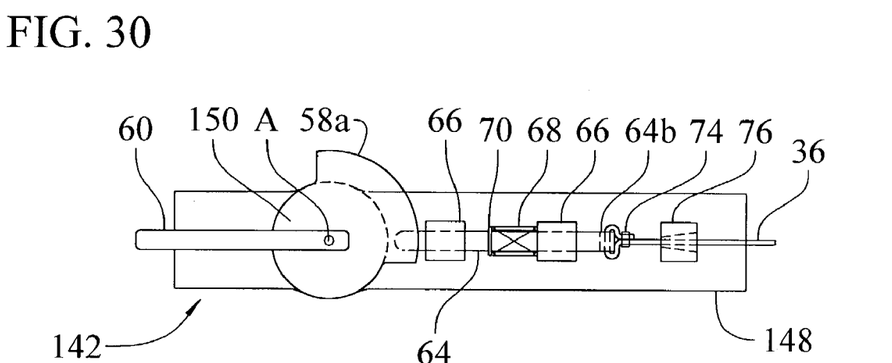
FIGS. 30 and 31 are top views of the alternate safety shutoff valve in the open and closed positions, respectively.
Figure 31:
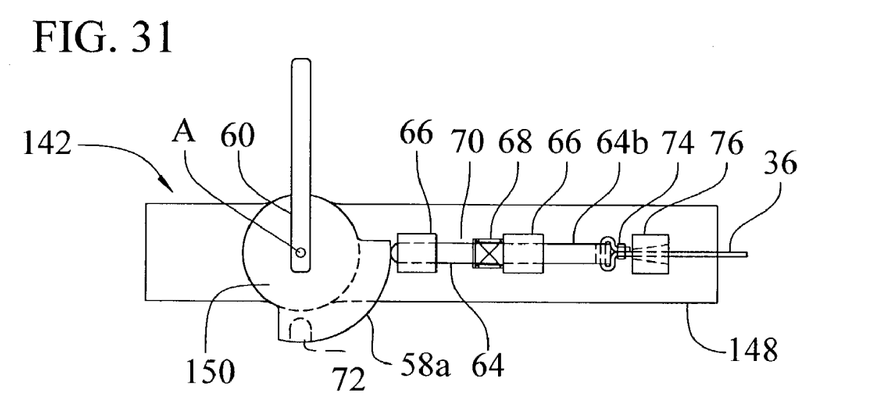

In a third alternate embodiment shown in FIG. 24, an anhydrous ammonia fertilizer system 180 includes a compressed air tank 184 located between the toolbar 20 and the nurse tank 16 and is coupled with hose 186 to the toolbar to supply compressed air to seed feeder tubes to set the seed in position when seeding is performed in the same pass as the fertilizer operation. In this instance, the safety shutoff valve 142 is connected to the ring 146 with release cable 182 that is similar to cable 144 but longer to pass by the compressed air tank. And as described above, cable 182 is preferably sized in length to actuate the safety valve closed as the hose becomes stretched towards its tensile strength limit, and in the event of a complete breakaway of the nurse tank from the toolbar and/or compressed air source. It will be recognized that the compressed air tank may alternately be replaced is replaced with an alternate source of compressed air, such as an air blower, to supply pressurized air to the feeder tubes, one or more other implements between the toolbar and the nurse tank.

From the foregoing, it will be apparent that the present invention brings to the art a new and improved safety system for mobile anhydrous ammonia fertilizer systems, which, by virtue of alternate and remote actuation mechanisms connected to a safety shutoff valve, is uniquely adapted to be remotely actuated closed and shut off the flow of anhydrous ammonia in the event of an actual or impending hose leak or other leak in the fertilizer system. The safety system enables the operator to quickly close the safety valve at a safe distance from leaking anhydrous ammonia in the event of a detected leak in the system, and automatically detects and closes the safety valve in the event of an actual or impending nurse tank breakaway from the tractor or implement to which it is connected. The safety system hereof is thus effective as an independent-path backup for the excess flow valve and the breakaway valve of the conventional fertilizer system, and substantially reduces the possibility of harm to the operator from exposure to the leaking hazardous ammonia fumes.

I claim:

1. A safety system for a mobile anhydrous ammonia fertilizer system having a nurse tank, an ammonia applicator, and a flexible hose releasably coupled therebetween, the applicator being configured for connection to a tractor for pulling the applicator and nurse tank through a field, the safety system comprising:
   a) a shutoff valve connected between the nurse tank and the hose, the shutoff valve being operable between open and closed positions to allow and prevent flow from the nurse tank to the applicator, respectively;
   b) a release lever located on the tractor and movable between first and second positions associate with said shutoff valve open and closed positions;
   c) a release cable connected between the shutoff valve and the release lever to enable closing of the shutoff valve with the release lever; and
   d) a shear section provided in the release cable in-line between the shutoff valve and the release lever for separation of the cable in the event of separation in the fertilizer system.

2. The safety system as defined in claim 1 further comprising first and second couplings releasably connecting the ends of the cable with the shutoff valve and the release lever, respectively.

3. The safety system as defined in claim 1 in which the cable is slidably connected to the applicator between the shutoff valve and the release lever.

4. The safety system as defined in claim 1 in which the shutoff valve is biased toward the closed position and includes a latch to maintain the valve in the open position, the cable being connected to release the latch and enable automatic closing of the valve.

5. The safety system as defined in claim 1 in which the shutoff valve includes a handle for manual movement of the valve between said open and closed positions.

6. The safety system as defined in claim 1 in which the cable is flexibly exposed between the shutoff valve and the release lever to enable closing the valve by pulling on the cable.

7. The safety system as defined in claim 1 in which the shutoff valve includes a safety lockout.

8. The safety system as defined in claim 1 in which the shear section includes male and female sections connected to intermediate ends of the cable and adapted for reconnection after separation.

9. The safety system as defined in claim 1 in which the shear section includes male and female sections connected to intermediate ends of the cable, the female section further comprising a replaceable insert slidably received into the male section.

10. A safety system for a mobile anhydrous ammonia fertilizer system having a nurse tank, an anhydrous ammonia applicator, and a flexible hose having an upstream end coupled to the nurse tank and a downstream end coupled to the applicator, the applicator being configured for connection to a tractor for pulling the applicator and nurse tank through a field, the safety system comprising:
   a) a shutoff valve connected between the nurse tank and upstream end of the hose, the shutoff valve being operable between open and closed positions to allow and prevent flow of anhydrous ammonia from the nurse tank to the applicator;
   b) a first release cable connected between the shutoff valve and in fixed relation to the downstream end of the hose with respect to at least one of the tractor and the applicator, the cable being movable to actuate the shutoff valve closed; and
   d) a shear section provided in-line in the release cable for separation of the cable in the event of separation of the nurse tank from the applicator.

11. The safety system as defined in claim 10 in which the first release cable is slidably connected to the applicator, and further comprising a release lever mounted in the tractor and a second release cable connected between the first release cable and the release lever.

12. The safety system as defined in claim 10 in which the shutoff valve is biased toward the closed position and includes a latch to maintain the valve in the open position, the cable being connected to release the latch and enable automatic closing of the valve.

13. The safety system as defined in claim 10 in which the shutoff valve includes a handle for manual movement of the valve between said open and closed positions.

14. The safety system as defined in claim 10 in which the cable is flexibly exposed to enable closing of the valve by pulling on the cable.

15. The safety system as defined in claim 10 in which the shear section includes male and female sections connected to intermediate ends of the cable and adapted for reconnection after separation.

16. The safety system as defined in claim 10 in which the shear section includes male and female sections connected to intermediate ends of the cable, the female section further comprising a replaceable insert slidably received into the male section.

\* \* \* \* \*